(12) United States Patent
Crampe et al.

(10) Patent No.: US 11,328,370 B2
(45) Date of Patent: May 10, 2022

(54) SYSTEM AND METHOD FOR ADAPTIVELY MAXIMIZING COST SAVINGS OR PROFITS FOR UTILITY USAGE

(71) Applicant: BEEBRYTE SAS, Lyons (FR)

(72) Inventors: Frederic Crampe, Singapore (SG); Patrick Leguillette, Singapore (SG)

(73) Assignee: BEEBRYTE SAS, Lyons (FR)

( * ) Notice: Subject to any disclaimer, the term of this patent is extended or adjusted under 35 U.S.C. 154(b) by 841 days.

(21) Appl. No.: 16/089,578

(22) PCT Filed: Mar. 17, 2017

(86) PCT No.: PCT/SG2017/050136
§ 371 (c)(1),
(2) Date: Sep. 28, 2018

(87) PCT Pub. No.: WO2017/171636
PCT Pub. Date: Oct. 5, 2017

(65) Prior Publication Data
US 2020/0311830 A1    Oct. 1, 2020

(30) Foreign Application Priority Data

Mar. 28, 2016  (SG) .......................... 10201602403R

(51) Int. Cl.
*G06Q 50/06*  (2012.01)
*G06Q 10/04*  (2012.01)
(52) U.S. Cl.
CPC ............. *G06Q 50/06* (2013.01); *G06Q 10/04* (2013.01)
(58) Field of Classification Search
CPC .................................................. G06Q 50/06
See application file for complete search history.

(56) References Cited

U.S. PATENT DOCUMENTS

2008/0046387 A1* 2/2008 Gopal .................. G01D 4/004
                                                    705/412
2014/0049109 A1    2/2014 Kearns et al.

FOREIGN PATENT DOCUMENTS

EP          2871742 A1    5/2015

OTHER PUBLICATIONS

L. Jia and L. Tong, "Renewable in distribution networks: Centralized vs. decentralized integration," 2015 IEEE Power & Energy Society General Meeting, 2015, pp. 1-5, doi: 10.1109/PESGM.2015.7286620. (Year: 2015).*

(Continued)

*Primary Examiner* — Emmett K. Walsh
(74) *Attorney, Agent, or Firm* — Rothwell, Figg, Ernst & Manbeck, P.C.

(57) ABSTRACT

According to the first aspect of the invention, a system for adaptively maximizing cost savings or profits over a period of time in response to a time-bound variable is provided, comprising: a limited capacity energy storage device configured to provide energy to or receive energy from an electrical consumer and/or producer and to alternatively receive energy from or supply energy to an electrical grid; a bilateral flow link operatively coupled to the energy storage device and configured to control a direction and a magnitude of a flow of the energy from or to the energy storage device, the magnitude of the energy being within an operating range comprising a maximum possible flow of energy to the energy storage device (in-flow limit) and a maximum possible flow of energy from the energy storage device (out-flow limit); and a control device operatively coupled to the bilateral flow link; wherein the control device controls an energy flow via the bilateral flow link in response to the time-bound variable used to adaptively maximize the cost savings or profits based on an estimated quantity of energy required by or provided by the electrical consumer (Continued)

and/or producer, the fill level of the storage device resulting from a rate of in-flow to the energy storage device or a rate of out-flow from the energy storage device over the period of time.

16 Claims, 7 Drawing Sheets

(56) References Cited

OTHER PUBLICATIONS

International Search Report cited in PCT/SG2017/050136 dated May 26, 2017, 3 pages.
International Preliminary Report on Patentability in PCT/SG2017/050136 dated Jul. 27, 2018, 6 pages.

* cited by examiner

SYSTEM AND METHOD FOR ADAPTIVELY MAXIMIZING COST SAVINGS OR PROFITS FOR UTILITY USAGE

CROSS REFERENCE TO RELATED APPLICATION

This application is a 35 U.S.C. 371 National Phase Entry Application from PCT/SG2017/050136, filed Mar. 17, 2017, which claims the benefit of Singapore Patent Application No. 10201602403R filed on Mar. 28, 2016, the disclosures of which are incorporated herein in their entireties by reference.

FIELD OF INVENTION

The present invention relates broadly, but not exclusively, to a system and method for adaptively maximising cost savings or profits, especially those that are used to maximise cost savings or profits for utility usage.

BACKGROUND

Currently, most electricity users have very limited options to reduce their utility bill once they have contracted a given tariff plan. Furthermore, even though the electricity users have some insight into their energy consumption, they do not or cannot act on it to maximise cost savings or profits because it involves processing large volume of data and performing complex prediction in real time.

Recently, there have been various avenues used to address this problem, in the form of behind-the-meter batteries, usually in combination with solar photo-voltaic generation systems to store any excess energy produced by the solar panels, especially energy that is not consumed right away by the building. This allows consumers to shift, store and trade electricity as they capture the best opportunity to obtain electricity. The problem with this approach is that it is generally based on an "a priori" management of the storage system based on historical building load profiles, with no adjustment based on real-time values.

A need therefore exists to provide systems and methods for adaptively maximising cost savings or profits that addresses one or more of the above problems.

Furthermore, other desirable features and characteristics will become apparent from the subsequent detailed description and the appended claims, taken in conjunction with the accompanying drawings and this background of the disclosure.

SUMMARY

According to the first aspect of the invention, a system for adaptively maximizing cost savings or profits over a period of time in response to a time-bound variable is provided, comprising: a limited capacity energy storage device configured to provide energy to or receive energy from an electrical consumer, or a producer or an electrical grid; a bilateral flow link operatively coupled to the energy storage device and configured to control the direction and the magnitude of a flow of the energy from or to the energy storage device, the magnitude of the energy being within an operating range comprising a maximum possible flow of energy to the energy storage device (in-flow limit) and a maximum possible flow of energy from the energy storage device (out-flow limit); and a control device operatively coupled to the bilateral flow link; and a bi-directional energy flow measurement device operatively coupled to the control device and the bilateral flow link, wherein the control device controls an energy flow via the bilateral flow link in response to the time-bound variable used to adaptively maximize the cost savings or profits based on an estimated quantity of energy required by or provided by the electrical consumer and/or producer, the fill level of the storage device resulting from a rate of in-flow to the energy storage device or a rate of out-flow from the energy storage device over the period of time and wherein the control device is further configured to calculate an optimal net metered energy (O) to be received from or provided to the electrical grid based on a quantity of energy provided to or received from the energy storage device via the bilateral flow link and the estimated quantity of energy required by or provided by the electrical consumer or the producer, the quantity of energy received from or provided to the electrical grid being measured by the bi-directional energy flow measurement device.

In an embodiment, the control device is further configured to identify a multi-dimensional search space within which the optimal net metered energy (O) over an identified time period can be found; and reduce the multi-dimensional search space to a first reduced search space (C*) within which the optimal net metered energy (O) can be found based on a maximum rate of in-flow or a maximum rate of out-flow, controllable via the bilateral flow link.

In an embodiment, the control device is further configured to: identify a sub-space (H*) within which the optimal net metered energy (O) can be found, so that an initial fill level and a targeted final fill level of the energy storage device are met, the sub-space (H*) being within the multi-dimensional search space; and reduce the multi-dimensional search space to a second reduced search space (CH*) within which the optimal net metered energy (O) can be found based on the maximum rate of in-flow or the maximum rate of out-flow controllable via the bilateral flow link and the initial fill level and the targeted final fill level of the energy storage device, the second reduced search space being an intersection between the sub-space (H*) and the first reduced search space (C*) within the multi-dimensional search space.

In an embodiment, the control device is further configured to reduce the second reduced search space (CH*) to a third reduced search space (CH**) based on a limited capacity of the energy storage device.

In an embodiment, the control device controls a fill level of the energy storage device via the bilateral flow link based on the difference between the initial fill level and the targeted final fill level of the energy storage device over the period of time, the level difference being used to compensate a drift of an average fill level of the energy storage device over the period of time.

In an embodiment, the control device determines the level difference based on at least one of (i) a long-term optimization of the average fill level of the energy storage device and (ii) losses to be incurred by system.

In an embodiment, wherein the energy storage device is a battery.

In an embodiment, the bilateral flow link comprises a bi-directional converter and a charger, the bi-directional converter and the charger being operatively coupled to the control device.

In an embodiment, the bi-directional energy flow measurement device is a bi-directional electrical meter.

According to the second aspect of the invention, a method for adaptively maximizing cost savings or profits in response to a time-bound variable in a system is provided. The system comprises a limited capacity energy storage device configured to provide energy to or receive energy from an electrical consumer, a producer or an electrical grid; a bilateral flow link operatively coupled to the energy storage device and configured to control a direction and a magnitude of a flow of the energy from or to the energy storage device, the magnitude of the energy being within an operating range comprising a maximum possible flow of energy to the energy storage device (in-flow limit) and a maximum possible flow of energy from the energy storage device (out-flow limit); a bi-directional energy flow management device operatively coupled to the control device and the bilateral flow link; and a control device operatively coupled to the bilateral flow link, the method comprising: controlling, by the control device, an energy flow via the bilateral flow link in response to the time-bound variable used to adaptively maximize the cost savings or profits based on an estimated quantity of energy required by or provided by the electrical consumer and/or producer, the fill level of the storage device resulting from a rate of in-flow to the energy storage device or a rate of out-flow from the energy storage device over the period of time; and calculating, by the control device, an optimal net metered energy (O) to be received from or provided to the electrical grid based on a quantity of energy provided to or received from the energy storage device via the bilateral flow link and the estimated quantity of energy required by or provided by the electrical consumer or the producer.

In an embodiment, the step of adaptively maximizing the cost savings or profits further comprises: identifying, by the control device, a multi-dimensional search space within which the optimal net metered energy (O) over an identified time period can be found; and reducing, by the control device, the multi-dimensional search space to a first reduced search space (C*) within which the optimal net metered energy (O) can be found based on a maximum rate of in-flow or the maximum rate of out-flow controllable via the bilateral flow link.

In an embodiment, the step of adaptively maximizing the cost savings or profits further comprises: identifying, by the control device, a sub-space (H*) within which the optimal net metered energy (O) can be found, so that an initial fill level and a targeted final fill level of the energy storage device are met, the sub-space (H*) being within the multi-dimensional search space; and reducing, by the control device, the multi-dimensional search space to a second reduced search space (CH*) within which the optimal net metered energy (O) can be found based on the maximum rate of in-flow or the maximum rate of out-flow controllable via the bilateral flow link and the initial fill level and a targeted final fill level of the energy storage device, the second reduced search space being an intersection between the sub-space (H*) and the first reduced search space (C*) within the multi-dimensional search space.

In an embodiment, the step of adaptively maximizing the cost savings or profits further comprises reducing the second reduced search space (CH*) to a third reduced search space (CH**) based on a limited capacity of the energy storage device.

In an embodiment, the step of adaptively maximizing the cost savings or profits is further based on the difference between the initial fill level of the energy storage device and the targeted final fill level of the energy storage device over the period of time, the level difference being used to compensate a drift of an average fill level of the energy storage device over the period of time.

In an embodiment, the method further comprises determining the level difference based on at least one of (i) a long-term optimization of the average fill level of the energy storage device and (ii) losses to be incurred by system.

According to the third aspect of the invention, a system for adaptively maximizing cost savings or profits over a period of time in response to a time-bound variable is provided, comprising: a limited capacity energy storage device configured to provide energy to or receive energy from an electrical consumer, a producer or an electrical grid; a bilateral flow link coupled to the energy storage device and configured to control a direction and a magnitude of a flow of the energy from or to the energy storage device, the magnitude of the energy being within an operating range comprising a maximum possible flow of energy to the energy storage device (in-flow limit) and a maximum possible flow of energy from the energy storage device (out-flow limit); and a bi-directional energy flow measurement device operatively coupled to the control device and the bilateral flow link, wherein the energy flow via the bilateral flow link is controlled in response to the time-bound variable used to adaptively maximize the cost savings or profits based on an estimated quantity of energy required by or provided by the electrical consumer or the producer, a fill level of the storage device resulting from a rate of in-flow to the energy storage device or a rate of out-flow from the energy storage device over a period of time, and an optimal net metered energy (O), to be received from or provided to the electrical grid, is calculated based on a quantity of energy provided to or received from the energy storage device via the bilateral flow link and the estimated quantity of energy required by or provided by the electrical consumer or producer, the quantity of energy received from or provided to the electrical grid being measured by the bi-directional energy flow measurement device.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
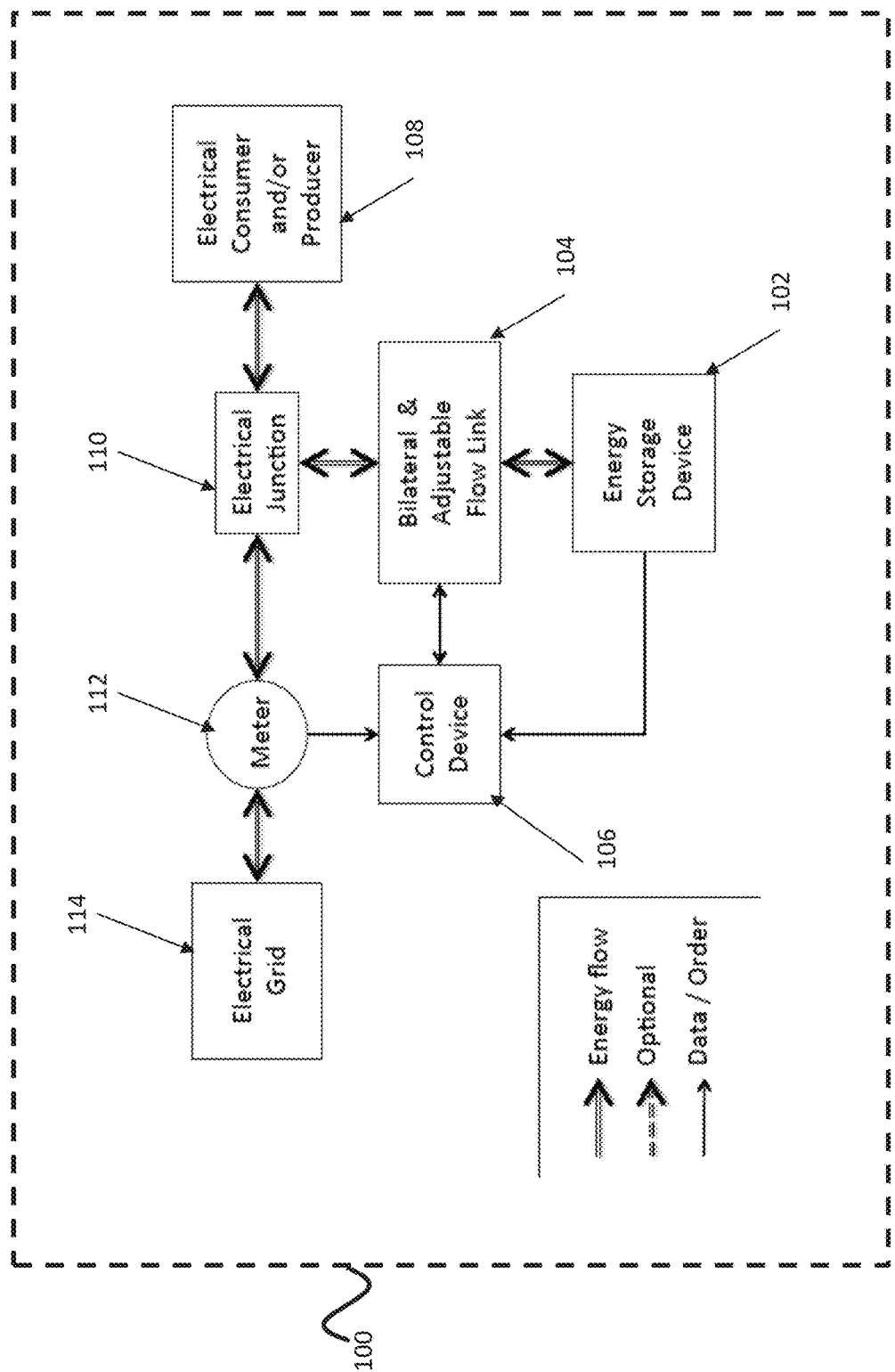
FIG. 1 shows a block diagram of a system 100 within which energy can be provided to or received from according to a first embodiment.

Embodiments of the present invention will be described, by way of example only, with reference to the drawings Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "receiving", "retrieving", "identifying", "predicting", "processing", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Various embodiments of the present invention relate to systems and methods for adaptively maximizing cost savings or profits for utility usage. In an embodiment, the method is a computer-implemented method which adaptively maximizes cost savings or profits for utility usage in response to a time-bound variable.

FIG. 1 illustrates a block diagram of a system 100 within which energy (for example, electrical energy) can be provided to or received from according to a first embodiment. The system 100 may be a Stationary Energy Storage System (SESS) which operates on operating principles of distributed behind-the-meter electrical system. The system 100 may include an energy storage device 102 operatively coupled to a bilateral adjustable flow link 104 and a control device 106. The bilateral adjustable flow link 104 is also operatively coupled to the control device 106 and an electrical junction 110 which is further coupled to an electrical consumer and/or producer 108. The system 100 further comprises a bi-directional energy flow measurement device (or meter) 112 that is operatively coupled to the control device 106, the electrical junction 110 and an electrical grid 114. The electrical junction 110 is a connecting point of the system (or SESS) 100. The transactional energy flow resulting from the operation of the SESS is diverted from or injected to the nominal flow between the electrical grid 114 and the electrical consumer and/or producer 108.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The energy storage device 102 may be any energy type known in the art, such as but without limitation, lithium-ion battery, sodium-ion battery, redox flow battery, lead-acid battery, nickel-metal-hydride battery, nickel-cadmium battery, or other fluid-energy sources, and may have a limited capacity. The limited capacity of the energy storage device 102 determines a fill level of the energy storage device 102. In an embodiment, the energy storage device 102 is a battery and the limited capacity refers to battery capacity. It is to be understood that the battery capacity for a given size battery depends on temperature, cut off voltages, charge/discharge rates or other battery parameters, and health of the battery depends on current battery parameters relative to an initial specification of the battery, e.g., from an original equipment manufacturer (OEM), and the past usage of the battery. In this regard, operating status parameters may indicate, for example, a current percentage of assumed (e.g., specified) capacity for the battery or battery network. A maximum actual capacity or intern resistivity (e.g., health) of a battery may be determined by measuring voltage, current, and temperature during charge and discharge cycles, and comparing those measurements to data sets known to represent various levels of health.

The energy storage device 102 is configured to (i), receive energy from the electrical grid 114 or (ii) receive energy from the electrical producer 108 or (iii) receive energy from the electrical grid 114 and the electrical producer 108, or alternatively (iv) provide energy to the electrical consumer 108 or (v) supply energy to the electrical grid 114 or (vi) provide energy to the electrical consumer 108 and supply energy to the electrical grid 114. In an embodiment, the bi-directional energy flow measurement device 112 is a bi-directional electrical meter that may be configured to measure a quantity of energy received from or provided to the electrical grid 114.

The bilateral adjustable flow link 104 (or bilateral flow link) is configured to control a direction and a magnitude of a flow of energy from or to the energy storage device 102. The magnitude of the energy is within an operating range comprising a maximum possible flow of energy to the energy storage device 102 (or in-flow limit) and a maximum possible flow of energy from the energy storage device 102 (or out-flow limit). In other words, the bilateral adjustable flow link 104 functionally accounts for the energy flow flowing between the energy storage device 102 and the electrical grid 114 and/or the electrical consumer and/or producer 108. That is, the bilateral adjustable flow link 104 allows for the flow of energy to and from the energy storage device 102 at an adjustable and controllable rate and also handles necessary conversions, if necessary.

The control device 106 is configured to control the energy flow via the bilateral flow link 104 in response to the time-bound variable used to adaptively maximise the cost savings or profits based on an estimated quantity of energy required by or provided by the electrical consumer and/or producer. The time-bound variable may be based on the fill level of the energy storage device 102. The fill level of the energy storage device 102 results from a rate of in-flow to the energy storage device 102 or a rate of out-flow from the energy storage device 102. The control device 106 may be further configured to calculate an optimal net metered energy (O) to be received from or provided to the electrical grid 114 based on a quantity of energy provided to or received from the energy storage device 102 via the bilateral flow link 104 and the estimated quantity of energy required by or provided by the electrical consumer and/or producer 108. The quantity of energy received from or provided to the electrical grid 114 may be measured by the bi-directional energy flow measurement device 112.

In the embodiment, the control device 106 may be further configured to identify a multi-dimensional search space within which the optimal net metered energy (O) over an identified time period can be found; and reduce the multi-dimensional search space to a first reduced search space (C*) within which the optimal net metered energy (O) can be found based on a maximum rate of in-flow or a maximum rate of out-flow, controllable via the bilateral flow link 104. In another embodiment, the control device 106 may be further configured to identify a sub-space (H*) within which the optimal net metered energy (O) can be found, so that an initial fill level and a targeted final fill level of the energy storage device 102 are met. The sub-space (H*) is one that is within the multi-dimensional search space. The control device 106 may also be configured to reduce the multi-dimensional search space to a second reduced search space (CH*) within which the optimal net metered energy (O) can be found based on the maximum rate of in-flow or the maximum rate of out-flow controllable via the bilateral flow link 104 and an initial fill level and a targeted final fill level of the energy storage device 102, the second reduced search space being an intersection between the sub-space (H*) and the first reduced search space (C*) within the multi-dimensional search space. The initial fill level refers to the fill level of the energy storage device 102 at the beginning of a period of time and the targeting final fill level refers to the projected fill level of the energy storage device 102 at the end of the same period of time.

In an embodiment, the control device 106 is further configured to reduce the second reduced search space (CH*) to a third reduced search space (CH) based on a limited capacity of the energy storage device 102**. It is to be understood that various numerical computations may be used to reduce the second reduced search space (CH*) to the third reduced search space (CH**). For example, it is possible to withdraw all points from the second reduced search space (CH*) so that the evolution of the corresponding fill level over the period of time is never negative or greater than the limited capacity of the energy storage device. The reduced result is the third reduced search space (CH**).

Further, the control device 106 controls the fill level of the energy storage device 102 via the bilateral flow link 104 based on a difference between the initial fill level and the targeted final fill level of the energy storage device over the period of time, the level difference being for instance used to compensate a drift of an average fill level of the energy storage device 102 over the period of time. In another embodiment, the control device 106 determines the level difference based on at least one of (i) the long-term optimization of the average fill level of the energy storage device 102 and (ii) losses to be incurred by the system 100.

The electrical grid 114 may stand for a quasi-infinite source or a well of energy which runs the SESS. The "quasi-infinite" nature of the grid refers to the fact that due to its dimension relatively to the SESS, its state an features are marginally affected by the operation of the SESS, and can be considered as independent from the SESS individually.

The bi-directional energy flow measurement device 112 is configured to measure energy flow that is exchanged between (i) the electrical consumer and/or producer 108 and the electrical grid 114 and/or (ii) the energy storage device 102 and the electrical grid 114. For example, if the energy storage device 102 is a battery and the electrical consumer and/or producer 108 is a consumer only, the bi-directional energy flow measurement device 112 may be a meter that is configured to measure electrical energy flow flowing from the electrical grid 114 to the energy storage 102 and the electrical consumer 108. A person skilled in the art will understand that the meter may be used by the utility as a reference for billing purpose.

Figure 2:
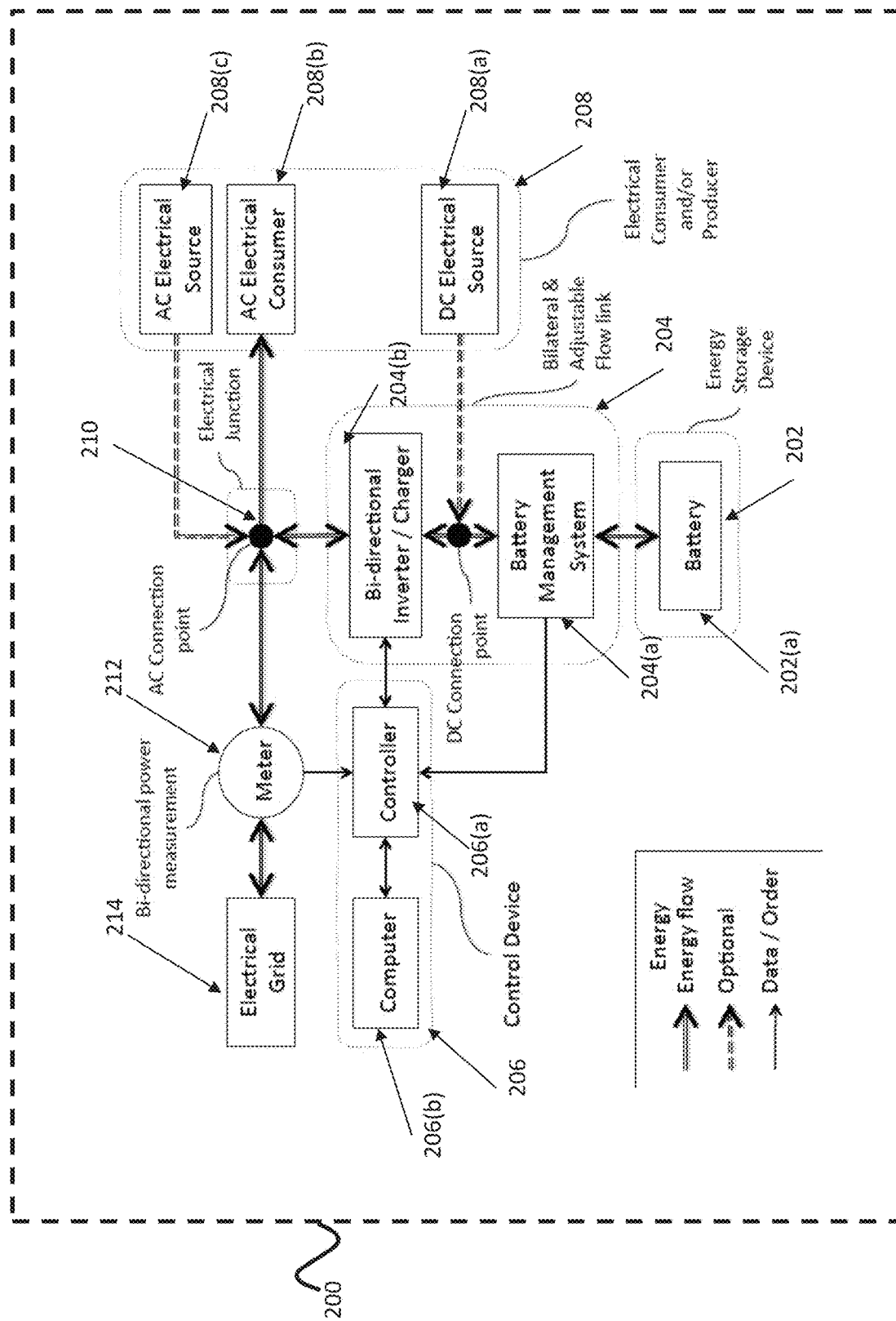
FIG. 2 shows a block diagram of a system 200 within which energy can be provided to or received from according to a second embodiment.

FIG. 2 illustrates a block diagram of a system 200 within which energy can be provided to or received from according to a second embodiment. In the second embodiment, the energy storage device 202 may be a battery which is operatively coupled to the bilateral and adjustable flow link (or bilateral flow link) 204. For example, the energy storage device 202 may be a battery, a combination or collection of batteries (including redox-flow devices), any alternate energy storage device (for example, flywheel, super-capacitors or hydrogen cycle). In this embodiment, the bilateral flow link 204 includes a battery management system 204(*a*) and a bi-directional converter and charger 204(*b*).

The battery management system 204(*a*) may be configured to perform low-level management of the battery 202, such as by protecting the battery 202 from operating outside predetermined operating limits, monitoring the operating state of the battery 202, processing the measurements of operating parameter of the battery 202, reporting the operating data of the battery 202 and controlling the operating environment of the battery 202.

The bi-directional converter and charger 204(*b*) may be operatively coupled to a control device 206. The control device 206 may include a controller 206(*a*) and a computer 206(*b*). The bi-directional converter and charger 204(*b*) is configured to handle various conversions between the electrical network and the battery 202. Further, the bi-directional converter and charger 204(b) is preferably configured to directly/indirectly charge or discharge the battery 202.

In this embodiment, the control device 206 comprises a controller 206(a) and a remote computer 206(b) which may function together to perform various operations. The control device 206 is operatively coupled to a bi-directional energy flow measurement device 212. In this embodiment, the bi-directional energy flow measurement device 204(b) is coupled to an electrical consumer and/or producer 208 via an electrical junction 210. The electrical junction 210 is a connecting point of the system (or SESS) 200. The transactional energy flow resulting from the operation of the SESS is diverted from or injected to the nominal flow between the electrical grid 214 and the electrical consumer and/or producer 208.

The remote computer 206(b) may be implemented as one or more servers which may be configured to communicate via the Internet, and which may be co-located or geographically distributed, for example, as will be appreciated by those skilled in the art. That is, in one example embodiment, the remote computer 206(b) may be part of a cloud computing system. The electrical consumer and/or producer 208 accounts for an electrical load (for example: all the electrical devices of a building where the SESS is installed). From a functional perspective, the electrical consumer and/or producer 208 may be considered as an electrical energy consumer and/or an electrical energy producer.

Most electrical networks installed in buildings are generally in alternate current (AC) and an energy storage device 202 is generally a direct current (DC) device. For example, in this embodiment, the electrical consumer and/or producer 208 may include a DC electrical source 208(a), an AC electrical consumer 208(b) and an AC electrical source 208(c). The DC electrical source 208(a) may be directly coupled to the battery management system 204(a) and may be configured to charge/discharge the energy storage device 202. The AC electrical source 208(c) is directly coupled to the electrical junction 210 and may be configured to provide energy via the electrical junction 210. The AC electrical consumer 208(b) is directly coupled to the electrical junction 210 and may be configured to consume energy from the electrical grid 214 and/or from the energy storage device 202 via the electrical junction 210.

Additionally, an energy management system (EMS) may be operatively coupled to the SESS and is configured to supervise operations of the SESS by collecting various internal data (status, measurements, etc.) of the system. Further, the EMS is configured to process the internal data (for example, data concerning the energy storage device 202) with other external data according to one of various management strategies and pilot the SESS accordingly. For example, in various embodiments, the EMS may be the control device 206 and may be configured to control the bi-directional inverter and charger 204(b).

Management of the SESS may be broken into the following operating steps which may be looped over time. The EMS may be configured to collect the latest internal operating data of the system (e.g., parameters, status) and external contextual data required by further computational steps. The EMS may also be configured to process and analyse the available data. In an implementation, the EMS may be configured to forecast potential environment values. Based on the potential prediction, the EMS may be configured to run some optimization routine aiming at optimizing the operations of the SESS according to at least one performance criteria. Eventually, the EMS may be configured to operate the SESS in accordance with the results of the optimization routine. The performance criteria may be technical, economical and/or environmental.

Figure 3:
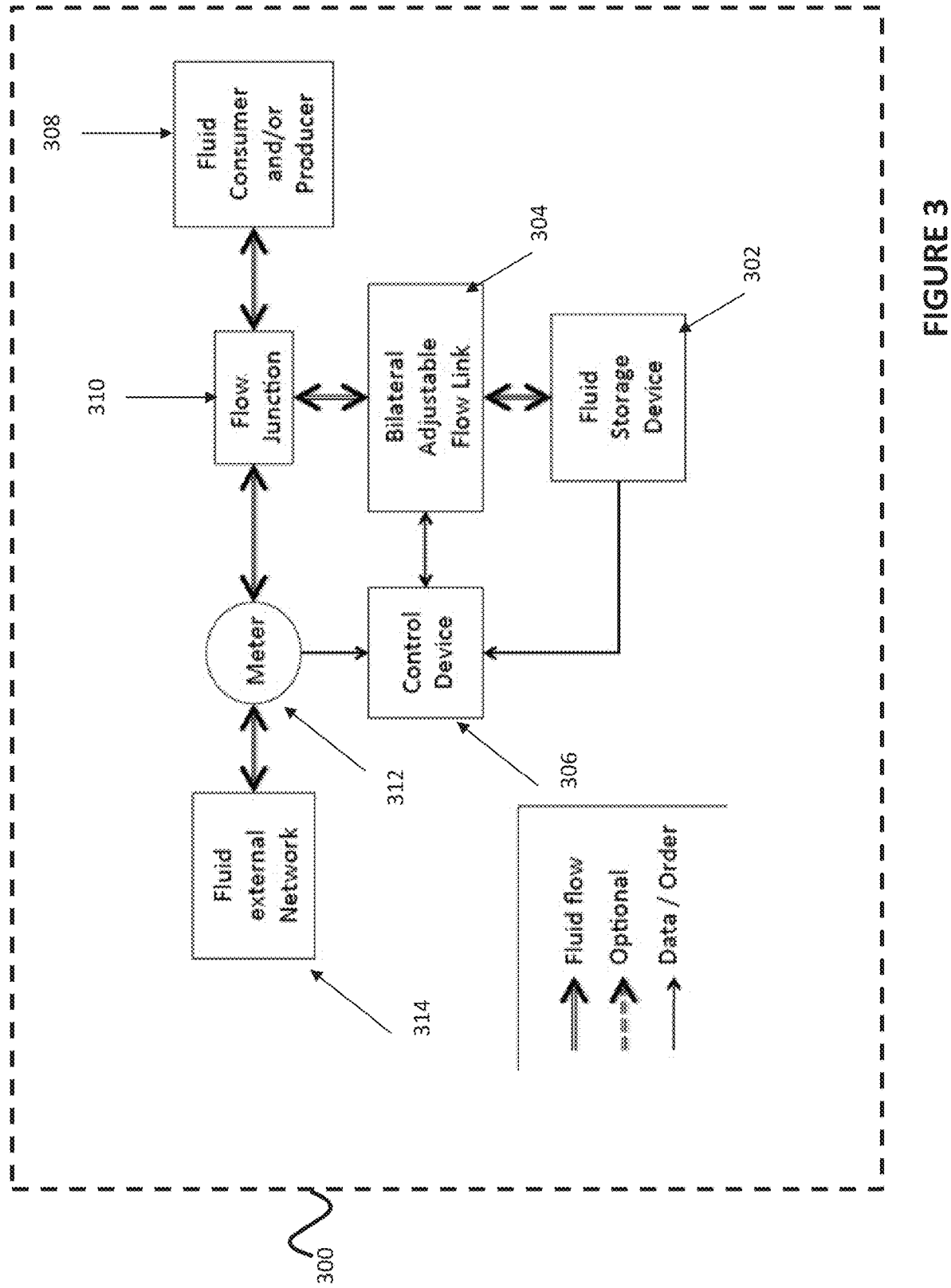
FIG. 3 shows a block diagram of a system 300 within which energy can be provided to or received from according to a third embodiment.

FIG. 3 shows a block diagram of a system 300 within which energy can be provided to or received from according to a third embodiment. In this embodiment, it can be seen that the energy storage device may be a fluid storage device 302 which is directly coupled to a control device 306 and a bilateral adjustable flow link 304. The bilateral adjustable flow link 304 is also coupled to the control device 306 and a flow junction 310 which is further coupled to a fluid consumer and/or producer 308. The system 300 further comprises a bi-directional energy flow measurement device (or meter) 312 that is operatively coupled to the control device 306, the flow junction 310 and a fluid external grid 314.

The battery described in FIG. 1 and FIG. 2 can be assimilated as a first approximation to an energy tank (or an energy storage capacity device) with:
  Limited Capacity: its Nominal energy Storage Capacity (NSC)
  Limited possible filing/pouring flow: its maximum charge and discharge powers In the embodiments that follow, a state of charge (SOC) of a battery may also be known as a fill level of the energy storage capacity device e.g. the ratio of stored energy relatively to the NSC. Hence, it comes $$\forall t: 0<SOC(t)<1, \text{ where } \forall t \text{ represents at any point in time during a period} \quad (1)$$

$$\text{Stored\_energy}(t)=NSC \cdot SOC(t) \quad (2)$$

Round-trip Efficiency For the sake of simplicity and clarity, the round-trip efficiency of the SESS is set to 1. That is, it is assumed that there is no loss of energy in a charge/discharge cycle. This approximation is coarse as the actual round-trip efficiency may significantly differ from 1 in real batteries, but it does not affect the methodology since a round-trip efficiency different from 1 can be handled by means of corrective coefficients applied to respectively the in-flow and out-flow of energy transiting through the bilateral adjustable flow link 304.

Ageing: A typical electrochemical battery has a limited lifecycle, since each and every charge/discharge cycle is slightly modifying the composition of the battery, affecting its performances. From an economic perspective, a battery may be considered as a consumable item with a certain "cycling potential". Each and every cycle is consuming this potential, and then has an intrinsic related cost. When used for energy trading, this "ageing cost" shall be lower than the trading profit resulting from arbitrage in energy price.

In the following calculations, an optimization period of 24 hours is considered, in accordance with a natural underlying daily cycle observed in most electrical load curves. It is to be understood that the optimization period of 24 hours is only an example and other optimization periods are also possible (e.g., 12 hours, 48 hours, etc.) in the following calculations. For the sake of simplicity, this optimization period is divided into 24 regular 1 h time-steps ($\Delta t$). Other regular time-steps may be used without prejudice to the generality of the exposed method. An identification and use of the Greater Common Divisor of the time-steps allows for the return to the method with regular time-steps. In the following calculations, the following will apply for sign conventions:
at the meter: the energy flow is considered from the grid perspective. Thus it is counted:

positively when energy is injected into the grid
negatively when energy is drawn from the grid
at battery level: the energy flow in the battery is counted:
positively when the battery is discharging
negatively when the battery is charging
at consumer/producer level: the energy flow is counted:
positively when acting as a consumer
negatively when acting as a producer For the sake of simplicity, it is considered that bid and offer (or buy and sell) energy prices from or to the grid are equal. The method can be generalized to situations where bid and offer prices differ, at the cost of increased complexity of its implementation, but without fundamental differences in the operating principle.

In the calculations below, the following definitions apply;

$T_n$: the umpteenth (n) calculation period (duration=T=24 h here)
$SOC_0(T_n)$: the State Of Charge of the battery at the beginning of period $T_n$
$SOC_i(T_n)$: the State Of Charge of the battery at time-step i of period $T_n$
$SOC_{24}(T_n)$: the State Of Charge of the battery at the end of period $T_n$
$P_{C\_max}$: the maximum Charging Power
$P_{D\_max}$: the maximum Discharging Power Over a 24 h calculation period that is divided into 1 h time-steps, the time-profile of any parameter $x(T_n)$ (for example, electric load price, etc.) may be a 24 time-series $\{x_0(T_n), x_1(T_n) \ldots, x_{23}(T_n)\}$, which can be represented by a 24-dimensional vector X $$X = \begin{bmatrix} x_0(T_n) \\ x_1(T_n) \\ \vdots \\ x_{23}(T_n) \end{bmatrix} \quad (3)$$

$L(T_n)$: the vector accounting for the 24 h raw load profile forecasted over $T_n$. According to the sign convention exposed above, all its coordinates are positive.
$S(T_n)$: the vector accounting for the 24 h self-generation (e.g. Solar PV) profile forecasted over $T_n$. According to the sign convention exposed above, all its coordinates are negative.
$N(T_n)$: the vector accounting for the 24 h power flow profile forecasted over $T_n$ at the meter, without battery in the system. Hence it also stands for a metering reference.
$K(T_n)$: the vector accounting for the 24 h price profile of energy to/from the grid, forecasted over $T_n$ (with the assumption that bid and offer prices are equal).
$B(T_n)$: the vector accounting for the 24 h charge/discharge power-order profile to be followed by the controller managing the battery.
$O(T_n)$: the vector accounting for the 24 h power flow profile forecasted over $T_n$ at the meter, with the battery in the system.

Taking out the power losses in the system, and taking into account the aforementioned sign conventions, the following will be obtained:

$$\forall n \geq 0; N(T_n) = -(S(T_n) + L(T_n)) \text{ and} \quad (4)$$

$$\forall n \geq 0: O(T_n) = N(T_n) + B(T_n) \quad (5)$$

Figure 4:
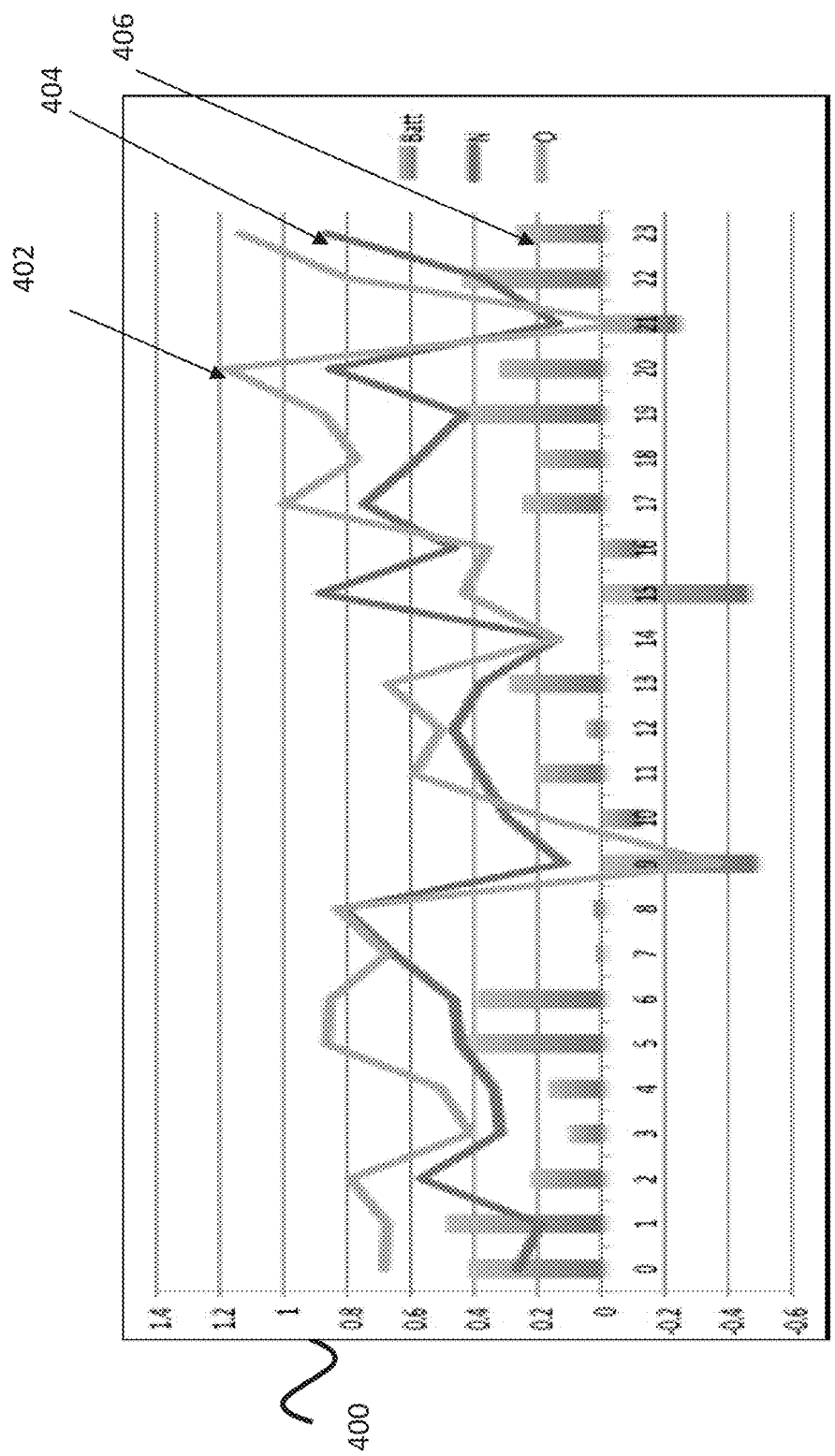
FIG. 4 illustrates how demand curves change in response to a charge/discharge sequence of a battery.

FIG. 4 illustrates how demand curves change in response to a charge/discharge sequence of a battery. Line 402 represents the power flow profile forecasted over $T_n$ at the meter, without the battery, $O(T_n)$. Line 404 represents the power flow profile forecasted over $T_n$ at the meter, with the battery, $N(T_n)$. 406 represents the 24 h charge/discharge power profile of the battery. In other words, it can be seen that line 402 is a summation of line 404 and 406, in accordance with equation (5).

Further, the forecasted reference-cost of energy $C_{ref}$ over $T_n$ can be calculated as follows:

$$\forall n \geq 0: C_{ref}(T_n) = -N(T_n) \cdot K^t(T_n) \cdot \Delta t = -(\Sigma_{i=0}^{23} n_i(T_n) \cdot k_i(T_n)) \cdot \Delta t \quad (6)$$

In the followings, most calculations are considered over a given similar $T_n$ period, and the "$(T_n)$" notation may be omitted for the sake of readability. When omitted, all vectors and components refer to this same generic implicit $T_n$.

The charging/discharging power constraints of the battery, can be written as follows $$\forall n > 0 \text{ and } \forall i = 0 \text{ to } 23: -P_{C\_max} < b_i(T_n) < P_{D\_max} \quad (7)$$

That can also be written for any $T_n$:

$$-P_{C\_max} \cdot 1 < B < P_{D\_max} \cdot 1 \quad (8)$$

With the 24 dimensional vector 1:

$$1 = \begin{bmatrix} 1 \\ 1 \\ \vdots \\ 1 \end{bmatrix} \quad (9)$$

Further:

$$-P_{C\_max} \cdot 1 < O - N < P_{D\_max} \cdot 1$$

Figure 5:
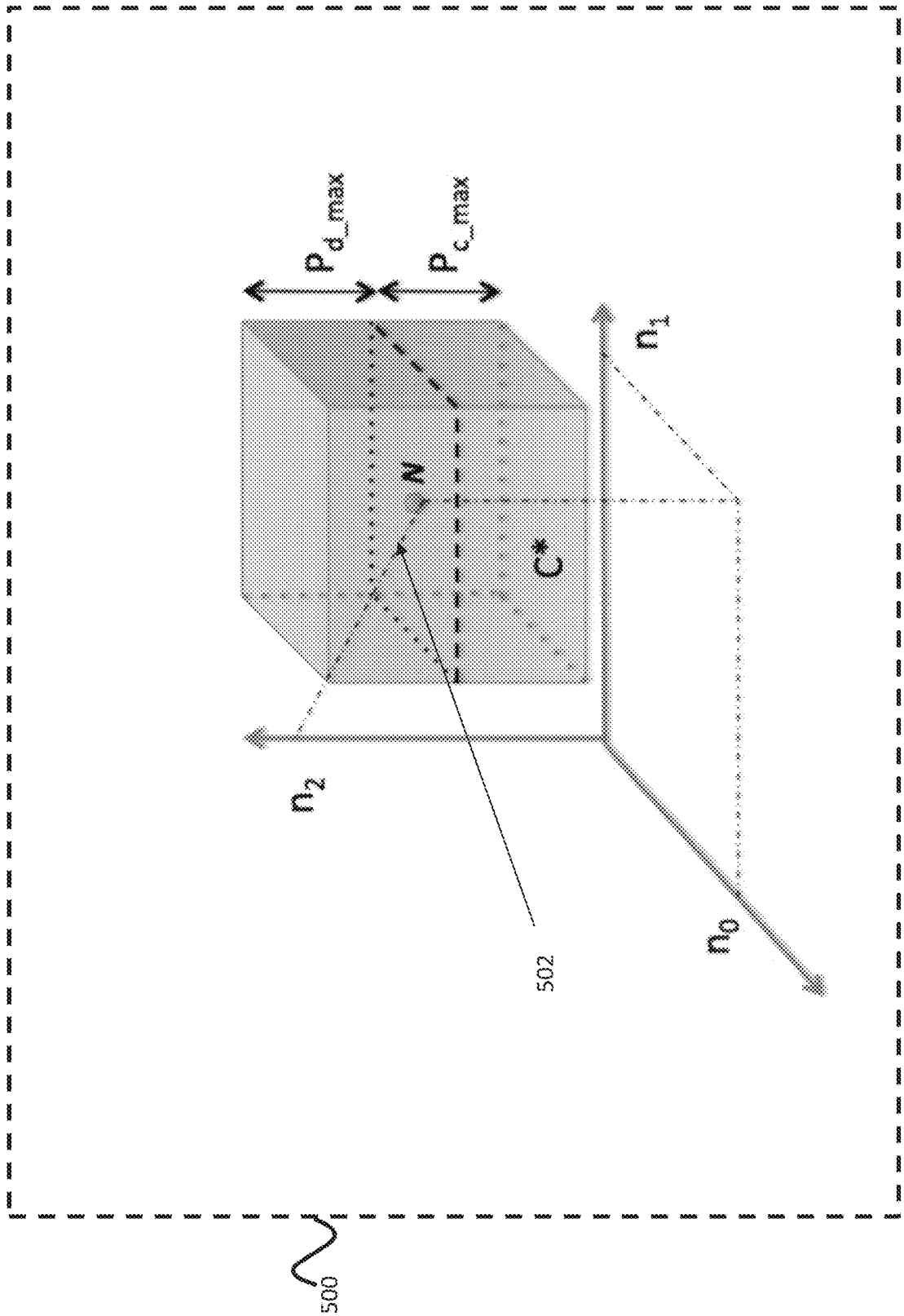
FIG. 5 illustrates a first reduced search space (C*) within which an optimal net metered energy (O) can be found.

Based on the above equations, it means that any achievable solution O shall necessarily be included in the hyper-cube C* centered on N with its 2*24 faces being respectively at $+P_{D\_max}$ and $-P_{C\_max}$ on both sides of the associated component of N as illustrated in 3D in FIG. 5.

The storage capacity constraint of the battery can be mathematically translated as follows:

$$\forall n \geq 0 \text{ and} \quad (10)$$

$$\forall i = 1 \text{ to } 24 : SOC_i(T_n) =$$

$$\max\left(0, \min\left(1, SOC_0(T_n) - \sum_{j=0}^{i-1} \frac{b_j(T_n) \cdot \Delta t}{NSC}\right)\right)$$

This feature introduces a highly non-linear constraint in the optimization problem to be solved in order to find the best charge-discharge sequence of the battery.

Managing the charge/discharge sequence of a battery and optimizing it over successive time periods $T_n$ implies a control of the evolution of the mean-reference SOC of the battery Indeed, by definition, we have:

$$\forall n > 0 : SOC_0(T_n) = SOC_{24}(T_{n-1}) \quad (11)$$

To avoid a mid/long-term drift of the mean reference SOC, and to be able to perform long-term cycle (duration greater than $T_n$) of the battery, an additional constraint over any period $T_n$ in the form of a bias $\delta n$ is introduced between the initial and the final SOC of the battery.

$$\forall n > 0 : SOC_{24}(T_n) = SOC_0(T_n) + \delta_n \quad (12)$$

Basically, if no long-term optimization is performed, one embodiment seeks to optimize the charge/discharge sequence of the battery over a calculation period $T_n$ with a constant revolving mean-reference SOC over the successive $T_n$, to avoid any mid or long term drift. Thus, the following SOC condition from (12) can be considered:

$$\forall n>0: SOC_{24}(T_n)=SOC_0(T_n) \quad (13)$$

Given the forecasted load curve L and solar PV output S, the raw demand curve N is calculated from (4), and $\Sigma N_i$ over $T_n$ is considered as a reference that can be known as $N_n$ in the following. Thus, using (5) constraint (13) eventually becomes:

$$\forall n 0: \Sigma_{i=0}^{23} b_i(T_n)=0 \Rightarrow \Sigma_{i=0}^{23} o_i(T_n)=N_n\{=\Sigma_{i=0}^{23} n_i(T_n)\} \quad (14)$$

Using vectors, the equation above becomes:

$$\vec{NO} \cdot \vec{1} = \vec{0} \quad (15)$$

The above equation actually is the definition of the hyper-plan H* containing points N and orthogonal to vector 1.

Combining this constraint with the charge/discharge limitation, any acceptable net demand curve O shall geometrically comply with:

$$O_{acceptable} \in (C^*_{inner} \cap H^*) \quad (16)$$

Figure 6:
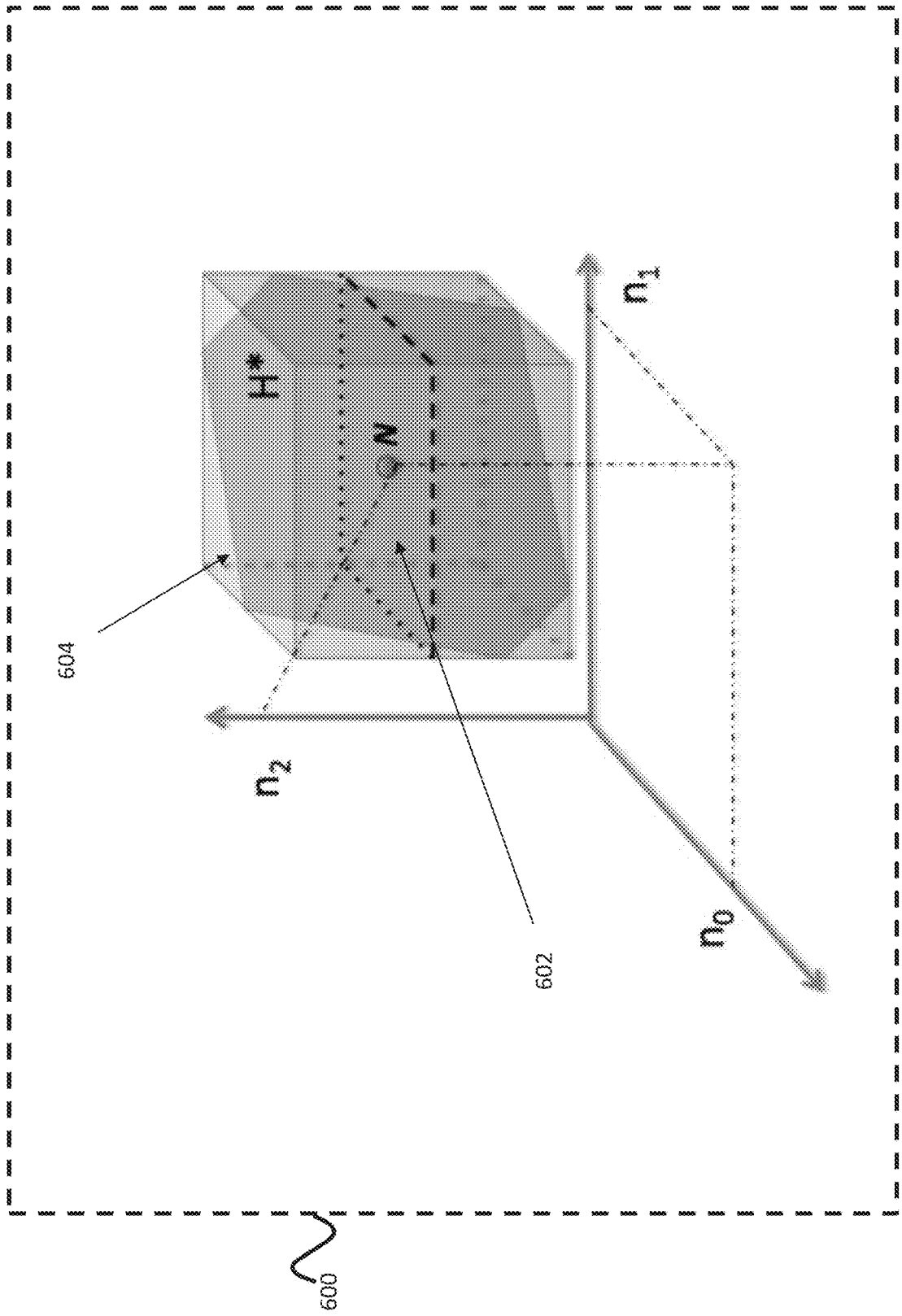
FIG. 6 illustrates a second reduced search space (CH*) that is derived from the first reduced search space (C*) within which an optimal net metered energy (O) can be found.

FIG. 6 illustrates this condition (hexagonal surface resulting from the intersection of C* and the plan containing N and orthogonal to 1).

Figure 7:
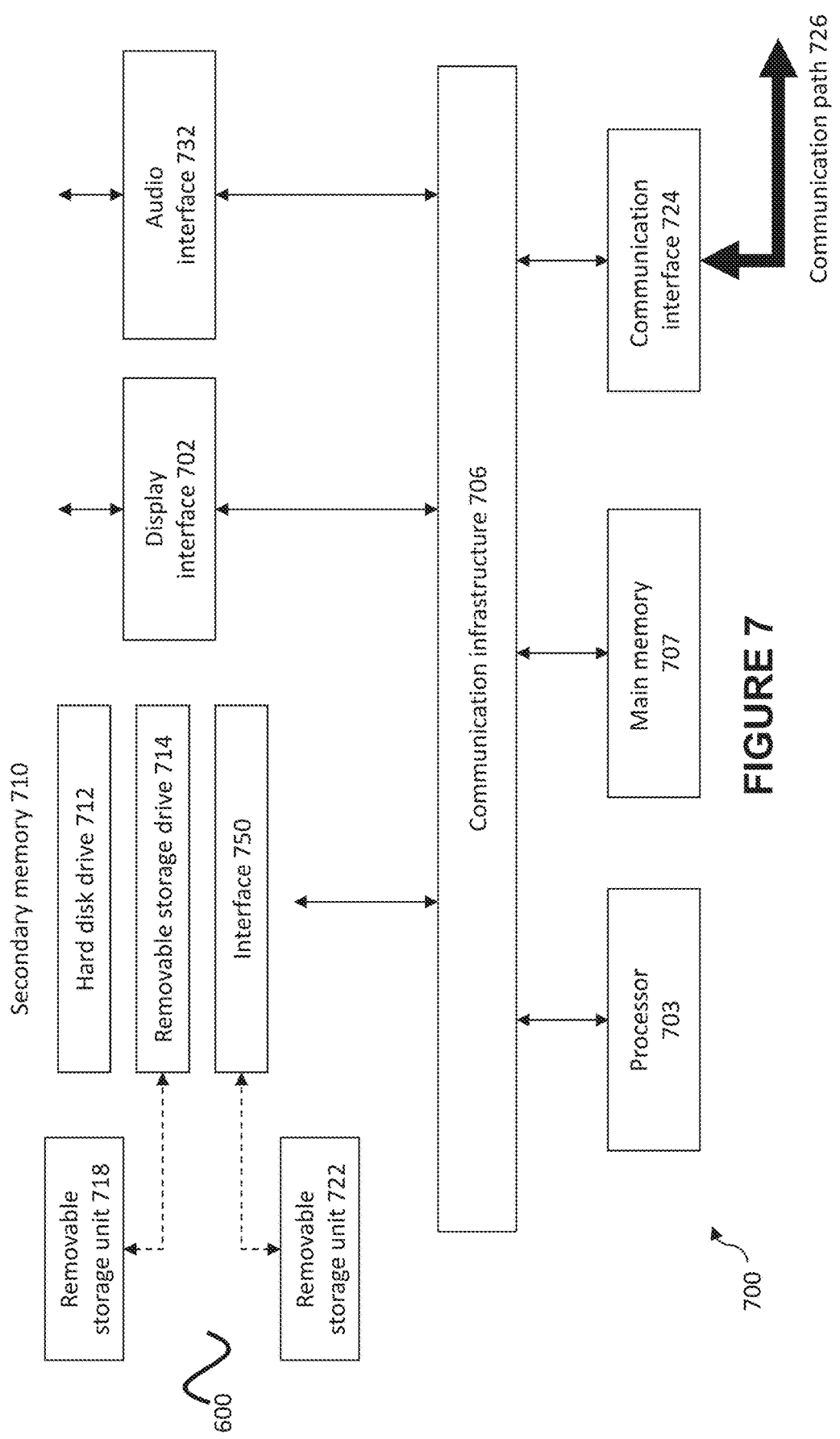
FIG. 7 shows a schematic diagram of a computer system suitable for use in executing a method.

FIG. 7 depicts an exemplary computer/computing device 700, hereinafter interchangeably referred to as a computer system 700, where one or more such computing devices 700 may be used to facilitate execution of the above-described method for adaptively maximizing cost savings or profits for utility usage. In addition, one or more components of the computer system 700 may be used to realize the computer 702. The following description of the computing device 700 is provided by way of example only and is not intended to be limiting.

As shown in FIG. 7, the example computing device 700 includes a processor 704 for executing software routines. Although a single processor is shown for the sake of clarity, the computing device 700 may also include a multi-processor system. The processor 704 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a storage drive 712, which may be a hard disk drive, a solid state drive or a hybrid drive and/or a removable storage drive 714, which may include a magnetic tape drive, an optical disk drive, a solid state storage drive (such as a USB flash drive, a flash memory device, a solid state drive or a memory card), or the like. The removable storage drive 714 reads from and/or writes to a removable storage medium 744 in a well-known manner. The removable storage medium 744 may include magnetic tape, optical disk, non-volatile memory storage medium, or the like, which is read by and written to by removable storage drive 714. As will be appreciated by persons skilled in the relevant art(s), the removable storage medium 744 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 740. Examples of a removable storage unit 722 and interface 740 include a program cartridge and cartridge interface (such as that found in video game console devices), a removable memory chip (such as an EEPROM, EPROM or PROM) and associated socket, a removable solid state storage drive (such as a USB flash drive, a flash memory device, a solid state drive or a memory card), and other removable storage units 722 and interfaces 740 which allow software and data to be transferred from the removable storage unit 722 to the computer system 700.

The computing device 700 also includes at least one communication interface 724. The communication interface 724 allows software and data to be transferred between computing device 700 and external devices via a communication path 726. In various embodiments of the inventions, the communication interface 724 permits data to be transferred between the computing device 700 and a data communication network, such as a public data or private data communication network. The communication interface 724 may be used to exchange data between different computing devices 700 which such computing devices 700 form part an interconnected computer network. Examples of a communication interface 724 can include a modem, a network interface (such as an Ethernet card), a communication port (such as a serial, parallel, printer, GPIB, IEEE 1394, RJ45, USB), an antenna with associated circuitry and the like. The communication interface 724 may be wired or may be wireless. Software and data transferred via the communication interface 724 are in the form of signals which can be electronic, electromagnetic, optical or other signals capable of being received by communication interface 724. These signals are provided to the communication interface via the communication path 726.

As shown in FIG. 7, the computing device 700 further includes a display interface 702 which performs operations for rendering images to an associated display 730 and an audio interface 732 for performing operations for playing audio content via associated speaker(s) 734.

As used herein, the term "computer program product" may refer, in part, to removable storage medium 744, removable storage unit 722, a hard disk installed in storage drive 712, or a carrier wave carrying software over communication path 726 (wireless link or cable) to communication interface 724. Computer readable storage media refers to any non-transitory, non-volatile tangible storage medium that provides recorded instructions and/or data to the computing device 700 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 724. Such computer programs, when executed, enable the computing device 700 to perform one or more features of embodiments discussed herein. In various embodiments, the computer programs, when executed, enable the processor 704 to perform features of the above-described embodiments. Accordingly, such computer programs represent controllers of the computer system 700.

Software may be stored in a computer program product and loaded into the computing device 700 using the removable storage drive 714, the storage drive 712, or the interface 740. Alternatively, the computer program product may be downloaded to the computer system 700 over the communications path 726. The software, when executed by the processor 704, causes the computing device 700 to perform functions of embodiments described herein.

It is to be understood that the embodiment of FIG. 7 is presented merely by way of example. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

For example, in some embodiments, the computing device 700 may be implemented as one or more servers which may be configured to communicate via the Internet, and which may be co-located or geographically distributed, as mentioned above with reference to FIG. 2.

It is to be understood that a cloud computing system can be composed of any number of computing devices 700 having at least one of the above mentioned functions. The cloud computing system may be a private or public system. The computing devices 700 can be in communication with one another across any communication system or network. That is, the cloud computing system can support a single cloud or service or any number of discrete clouds or services.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for adaptively maximizing cost savings or profits over a period of time in response to a time-bound variable, comprising:
 a limited capacity energy storage device configured to provide energy to or receive energy from an electrical consumer, a producer or an electrical grid;
 a bilateral flow link operatively coupled to the energy storage device and configured to control a direction and an adjustable magnitude of a flow of the energy from or to the energy storage device, the adjustable magnitude of the energy being within an operating range comprising a maximum possible flow of energy to the energy storage device (in-flow limit) and a maximum possible flow of energy from the energy storage device (out-flow limit);
 a control device operatively coupled to the bilateral flow link; and
 a bi-directional energy flow measurement device operatively coupled to the control device and the bilateral flow link,
 wherein the control device controls an energy flow via the bilateral flow link in response to the time-bound variable used to adaptively maximize the cost savings or profits based on an estimated quantity of energy required by or provided by the electrical consumer or the producer, the fill level of the storage device resulting from a rate of in-flow to the energy storage device or a rate of out-flow from the energy storage device over the period of time,
 wherein the control device is further configured to calculate an optimal net metered energy (O) to be received from or provided to the electrical grid based on a quantity of energy provided to or received from the energy storage device via the bilateral flow link and the estimated quantity of energy required by or provided by the electrical consumer or the producer, the quantity of energy received from or provided to the electrical grid being measured by the bi-directional energy flow measurement device, and
 wherein the control device is further configured to:
 identify a multi-dimensional search space within which the optimal net metered energy (O) over an identified time period can be found; and
 reduce the multi-dimensional search space to a first reduced search space (C*) within which the optimal net metered energy (O) can be found based on a maximum rate of in-flow or a maximum rate of out-flow, controllable via the bilateral flow link.

2. The system according to claim 1, wherein the control device is further configured to:
 identify a sub-space (H*) within which the optimal net metered energy (O) can be found, so that an initial fill level and a targeted final fill level of the energy storage device are met, the sub-space (H*) being within the multi-dimensional search space; and
 reduce the multi-dimensional search space to a second reduced search space (CH*) within which the optimal net metered energy (O) can be found based on the maximum rate of in-flow or the maximum rate of out-flow controllable via the bilateral flow link and the initial fill level and the targeted final fill level of the energy storage device, the second reduced search space being an intersection between the sub-space (H*) and the first reduced search space (C*) within the multi-dimensional search space.

3. The system according to claim 2, wherein the control device is further configured to reduce the second reduced search space (CH*) to a third reduced search space (CH**) based on a limited capacity of the energy storage device.

4. The system according to claim 1, wherein the energy storage device is a battery.

5. The system according to claim 1, wherein the bi-directional energy flow measurement device is a bi-directional electrical meter.

6. A system for adaptively maximizing cost savings or profits over a period of time in response to a time-bound variable, comprising:
 a limited capacity energy storage device configured to provide energy to or receive energy from an electrical consumer, a producer or an electrical grid;
 a bilateral flow link operatively coupled to the energy storage device and configured to control a direction and an adjustable magnitude of a flow of the energy from or to the energy storage device, the adjustable magnitude of the energy being within an operating range comprising a maximum possible flow of energy to the energy storage device (in-flow limit) and a maximum possible flow of energy from the energy storage device (out-flow limit);

a control device operatively coupled to the bilateral flow link; and a bi-directional energy flow measurement device operatively coupled to the control device and the bilateral flow link, wherein the control device controls an energy flow via the bilateral flow link in response to the time-bound variable used to adaptively maximize the cost savings or profits based on an estimated quantity of energy required by or provided by the electrical consumer or the producer, the fill level of the storage device resulting from a rate of in-flow to the energy storage device or a rate of out-flow from the energy storage device over the period of time, wherein the control device is further configured to calculate an optimal net metered energy (O) to be received from or provided to the electrical grid based on a quantity of energy provided to or received from the energy storage device via the bilateral flow link and the estimated quantity of energy required by or provided by the electrical consumer or the producer, the quantity of energy received from or provided to the electrical grid being measured by the bi-directional energy flow measurement device, and wherein the control device controls the fill level of the energy storage device via the bilateral flow link based on a level difference between an initial fill level and a targeted final fill level of the energy storage device over the period of time, the level difference being used to compensate a drift of an average fill level of the energy storage device over the period of time.

7. The system according to claim 6, wherein the control device determines the level difference based on at least one of (i) a long-term optimization of the average fill level of the energy storage device and (ii) losses to be incurred by system.

8. The system according to claim 6, wherein the energy storage device is a battery.

9. The system according to claim 8, wherein the bilateral flow link comprises a bi-directional converter and a charger, the bi-directional converter and the charger being operatively coupled to the control device.

10. The system according to claim 6, wherein the bi-directional energy flow measurement device is a bi-directional electrical meter.

11. A method for adaptively maximizing cost savings or profits in response to a time-bound variable in a system, the system comprising:
a limited capacity energy storage device configured to provide energy to or receive energy from an electrical consumer, a producer or an electrical grid;
a bilateral flow link operatively coupled to the energy storage device and configured to control a direction and an adjustable magnitude of a flow of the energy from or to the energy storage device, the adjustable magnitude of the energy being within an operating range comprising a maximum possible flow of energy to the energy storage device (in-flow limit) and a maximum possible flow of energy from the energy storage device (out-flow limit);
a bi-directional energy flow measurement device operatively coupled to the control device and the bilateral flow link; and
a control device operatively coupled to the bilateral flow link, the method comprising:
controlling, by the control device, an energy flow via the bilateral flow link in response to the time-bound variable used to adaptively maximize the cost savings or profits based on an estimated quantity of energy required by or provided by the electrical consumer and/or producer, a fill level of the energy storage device resulting from a rate of in-flow to the energy storage device or a rate of out-flow from the energy storage device over the period of time; and
calculating, by the control device, an optimal net metered energy (O) to be received from or provided to the electrical grid based on a quantity of energy provided to or received from the energy storage device via the bilateral flow link and the estimated quantity of energy required by or provided by the electrical consumer or the producer,
wherein the step of adaptively maximizing the cost savings or profits further comprises:
identifying, by the control device, a multi-dimensional search space within which the optimal net metered energy (O) over an identified time period can be found; and
reducing, by the control device, the multi-dimensional search space to a first reduced search space (C*) within which the optimal net metered energy (O) can be found based on a maximum rate of in-flow or the maximum rate of out-flow controllable via the bilateral flow link.

12. The method according to claim 11, wherein the step of calculating further comprises:
identifying, by the control device, a sub-space (H*) within which the optimal net metered energy (O) can be found, so that an initial fill level and a targeted final fill level of the energy storage device are met, the sub-space (H*) being within the multi-dimensional search space; and
reducing, by the control device, the multi-dimensional search space to a second reduced search space (CH*) within which the optimal net metered energy (O) can be found based on the maximum rate of in-flow or the maximum rate of out-flow controllable via the bilateral flow link and the initial fill level and a targeted final fill level of the energy storage device, the second reduced search space being an intersection between the sub-space (H*) and the first reduced search space (C*) within the multi-dimensional search space.

13. The method according to claim 12, wherein the step of calculating further comprises reducing the second reduced search space (CH*) to a third reduced search space (CH**) based on a limited capacity of the energy storage device.

14. A method for adaptively maximizing cost savings or profits in response to a time-bound variable in a system, the system comprising:
a limited capacity energy storage device configured to provide energy to or receive energy from an electrical consumer, a producer or an electrical grid;
a bilateral flow link operatively coupled to the energy storage device and configured to control a direction and an adjustable magnitude of a flow of the energy from or to the energy storage device, the adjustable magnitude of the energy being within an operating range comprising a maximum possible flow of energy to the energy storage device (in-flow limit) and a maximum possible flow of energy from the energy storage device (out-flow limit);

a bi-directional energy flow measurement device operatively coupled to the control device and the bilateral flow link; and a control device operatively coupled to the bilateral flow link, the method comprising:

controlling, by the control device, an energy flow via the bilateral flow link in response to the time-bound variable used to adaptively maximize the cost savings or profits based on an estimated quantity of energy required by or provided by the electrical consumer and/or producer, a fill level of the energy storage device resulting from a rate of in-flow to the energy storage device or a rate of out-flow from the energy storage device over the period of time;

calculating, by the control device, an optimal net metered energy (O) to be received from or provided to the electrical grid based on a quantity of energy provided to or received from the energy storage device via the bilateral flow link and the estimated quantity of energy required by or provided by the electrical consumer or the producer;

determining a level difference between the initial fill level of the energy storage device and the targeted final fill level of the energy storage device over the period of time; and compensating a drift of an average fill level of the energy storage device over the period of time using the level difference.

15. The method according to claim 14, wherein determining the level difference comprises determining the level difference based on at least one of (i) a long-term optimization of the average fill level of the energy storage device and (ii) losses to be incurred by system.

16. The system according to claim 4, wherein the bilateral flow link comprises a bi-directional converter and a charger, the bi-directional converter and the charger being operatively coupled to the control device.

* * * * *